(No Model.)
J. W. VAUGHN.
OBSTETRIC BED PAN.
No. 543,516.  Patented July 30, 1895.
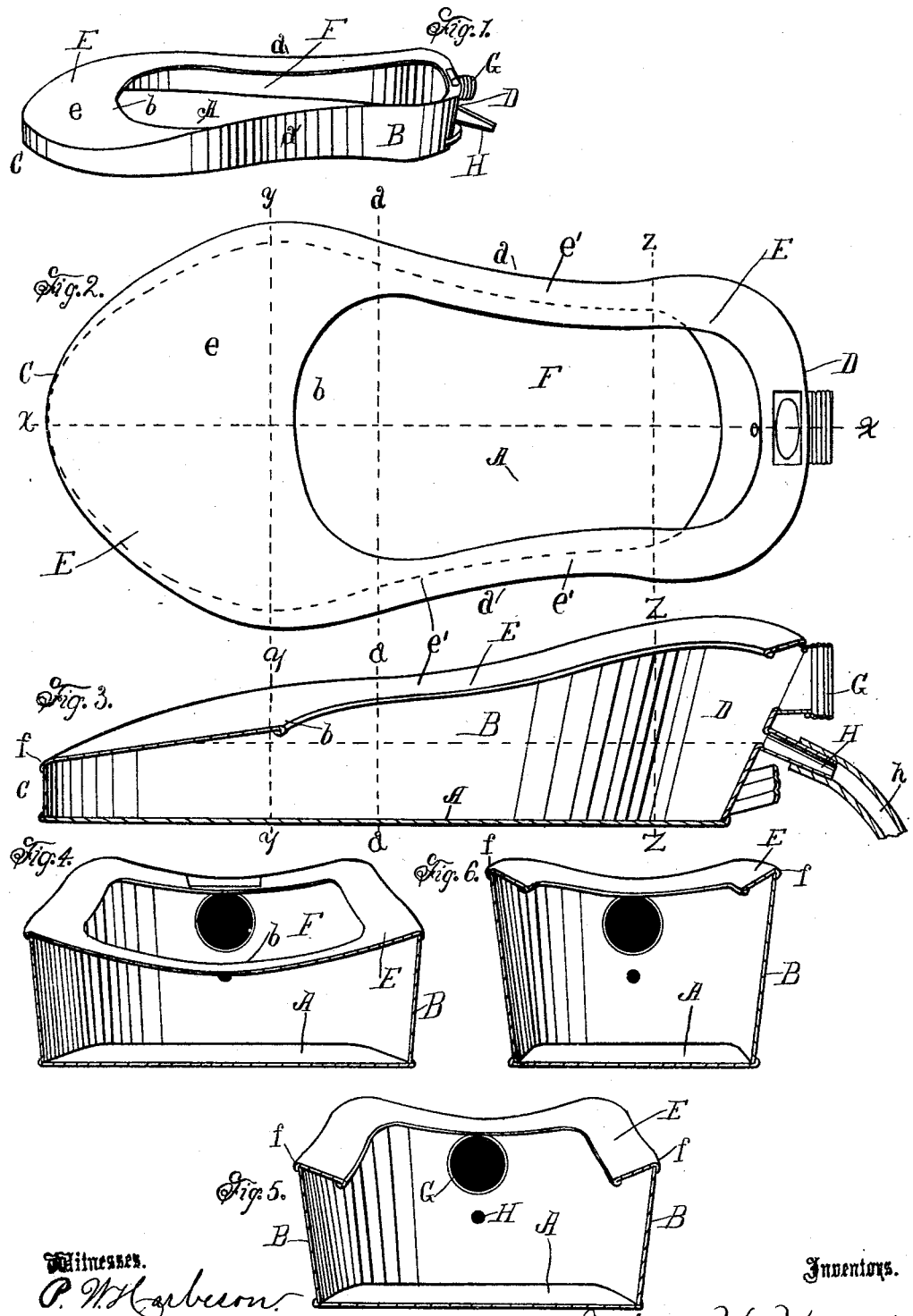

UNITED STATES PATENT OFFICE.

JOHN W. VAUGHN, OF LOS ANGELES, CALIFORNIA.

OBSTETRIC BED-PAN.

SPECIFICATION forming part of Letters Patent No. 543,516, dated July 30, 1895.

Application filed February 13, 1892. Serial No. 421,371. (No model.)

*To all whom it may concern:*

Be it known that I, JOHN W. VAUGHN, a citizen of the United States, residing at Los Angeles, in the county of Los Angeles and State of California, have invented a new and useful Improved Obstetric Bed-Pan, of which the following is a specification.

My invention relates specifically to the form, shape, relative size, proportions, and arrangement of the top, walls, and bottom of the pan, whereby the pan is specially adapted for more convenient use in obstetrics than are pans heretofore made.

The object of my invention is to provide a bed-pan which will afford superior ease and comfort to the patient, and which will allow the greatest convenience of access to the parts of the patient to allow the free use of douches as well as to allow natural evacuations.

It frequently occurs that the pan is required to remain in position for a considerable length of time, during which numerous douches are given and during which a greater or less deposit of offensive matter is made.

My improved pan is specially adapted to allow the patient to rest on the pan in a comfortable recumbent position, so that it will be immaterial how long, within any reasonable time, the pan is kept in use. It is also adapted to allow the bottom of the pan to be wholly covered with sufficient depth of water to submerge the offensive matter, thus to prevent the odor from arising therefrom, and at the same time provide sufficient room to avoid the liability that the operator might accidentally put his hands or instruments into the same.

The accompanying drawings illustrate my invention.

Figure 1 is a perspective view. Fig. 2 is a plan view. Fig. 3 is a longitudinal vertical mid-section. Fig. 4 is a transverse section on line $y\ y$. Fig. 5 is a transverse section on line $a\ a$. Fig. 6 is a transverse section on line $z\ z$. Figs. 4, 5, and 6 are slightly in perspective.

The bed-pan comprises the bottom A, plain and flat throughout to give a firm support to the pan and avoid all tipping or tilting thereof which might cause the fluid to swash, the walls B, secured to such bottom and substantially perpendicular at rear and sides and increasing in height from the rear C to the front D, and the concave semi-oblate pyriform top E, having the outwardly and downwardly rounded edges $f$, and having at its front the oblate pyriform opening F, extending to the base or rear seat-piece $e$ of the top and surrounded by the narrow inwardly projecting and sloping rim $e'$.

My invention consists in a bed-pan of oblate pyriform horizontal section, flat bottom, and sloping concave oblate pyriform top, narrower at front than back, and having its greatest depth at the narrower front end, and having its top broad at the rear portion, and formed at its broad rear portion into the rear seat-piece $e$, and provided in its neck or narrower forward portion with the oblate pyriform opening F, having its base at the rear of and wholly in the neck or narrower portion of the pan.

The top is devoid of all upward projections.

The front end is supplied with the nozzles or other suitable openings G H, through which the contents of the vessel may be emptied. The opening H may be provided with a suitable hose, as shown, so that the fluid can be drawn off before it reaches the lowest point $b$ of the opening F.

In Fig. 3 the line is indicated to which the water would rise before flowing out.

The oblate pyriform top and opening give superior comfort to the patient, as it requires but little spreading of the limbs to enable the patient to use it, and much greater room is secured for the introduction of the hands and instruments of the operator than in any form heretofore known.

In practice the pan is placed with its seat-piece $e$ under the hips of the patient, with the rear of the opening beneath the parts of the patient, whose limbs are disposed at the sides of the neck or body $a$ of the vessel, the rounded edges of the top allowing them to rest thereon without discomfort.

The peculiar shape of the pan affords the operator superior facility of access for examination and for the application of douches.

The increased depth or height of wall at the front end D affords a suitable rest for the arms of the operator.

Now, having described my invention, what I claim as new, and desire to secure by Letters Patent, is—

A bed pan of oblate pyriform horizontal section, flat bottom and sloping concave oblate pyriform top, narrower at front than back and having its greatest depth at the narrower front end, and having its top broad at the rear portion and formed at its broad rear portion into the seat-piece e, and provided in its neck or narrower forward portion with the oblate pyriform opening F, having its base at the rear of and wholly in the neck of the pan.

JOHN W. VAUGHN.

Witnesses:
JAMES R. TOWNSEND,
ALFRED I. TOWNSEND.